United States Patent

Shirota et al.

[11] Patent Number: 5,135,571
[45] Date of Patent: Aug. 4, 1992

[54] RECORDING LIQUID

[75] Inventors: Katsuhiro Shirota, Hiratsuka; Osamu Nishiwaki, Atsugi; Kazuo Iwata, Yokohama; Shinichi Tochihara, Hadano, all of Japan

[73] Assignee: Canon Kabushiki Kaisha, Tokyo, Japan

[21] Appl. No.: 604,351

[22] Filed: Oct. 30, 1990

Related U.S. Application Data

[63] Continuation-in-part of Ser. No. 361,324, Jun. 5, 1989, abandoned.

[30] Foreign Application Priority Data

Jun. 7, 1988 [JP] Japan .................. 63-138555
Mar. 7, 1989 [JP] Japan .................. 1-52805
Mar. 7, 1989 [JP] Japan .................. 1-52806

[51] Int. Cl.⁵ ............................ C09D 11/02
[52] U.S. Cl. ............................ 106/22; 106/20
[58] Field of Search ............................ 106/20, 22

[56] References Cited

U.S. PATENT DOCUMENTS

| | | | |
|---|---|---|---|
| 4,512,807 | 4/1985 | Ogawa et al. | 106/22 |
| 4,631,085 | 12/1986 | Kawanishi et al. | 106/22 |
| 4,647,310 | 3/1987 | Shimada et al. | 106/22 |
| 4,685,968 | 8/1987 | Palmer | 106/23 |
| 4,761,180 | 8/1988 | Askeland et al. | 106/20 |
| 4,853,037 | 8/1989 | Johnson et al. | 106/20 |
| 4,864,324 | 9/1989 | Shirota et al. | 106/22 |

Primary Examiner—William R. Dixon, Jr.
Assistant Examiner—Helene Klemanski
Attorney, Agent, or Firm—Fitzpatrick, Cella, Harper & Scinto

[57] ABSTRACT

A recording liquid, comprising a recording agent which is a component that forms a recorded image and a liquid medium in which said recording agent is dissolved or dispersed, wherein said recording agent comprises a dye represented by the Formula (A)

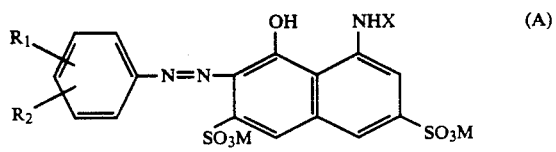

wherein $R_1$ and $R_2$ are selected from the group consisting of a hydrogen atom, a methyl group, a methoxy group, a chloro group, a sulfonic acid group; X represents a residual group of an organic acid; and M represents a base selected from the group consisting of an alkali metal group, an ammonium group, and an organic amine group and at least one dye selected from the group consisting of C.I. Acid Red 131, C.I. Acid Red 274, C.I. Direct Red 227 and C.I. Direct Red 9.

83 Claims, 3 Drawing Sheets

RECORDING LIQUID

This application is a continuation-in-part division, of application Ser. No. 361,324 filed Jun. 5, 1989, now abandoned.

BACKGROUND OF THE INVENTION

1. Field of the Invention

The present invention relates to a recording solution (hereinafter "ink"), and more particularly to an ink suited for systems in which a record is made on a plain paper by ejecting ink, in the form of droplets, from a minute ejection opening (or ejection orifice) provided in a recording head.

2. Related Background Art

Hitherto having been used as inks in writing utensils such as fountain pens and felt pens are those inks comprising various types of dye dissolved in water or other organic solvent.

Inks comprising various types of dye dissolved in water or other organic solvents are also used in ink-jet systems in which recording is performed by ejecting ink from an ejection orifice provided in a recording head, by the action of the oscillation attributable to a piezoelectric oscillator or the electrostatic force attributable to the application of a high voltage. However, the inks for ink-jet systems are required to satisfy more severe conditions with respect to many performances than those required in the writing utensils such as fountain pens and felt pens commonly used.

The ink-jet systems make less noise and can perform high-speed recording or color recording on plain paper without any particular fixing step, and researches have been energetically made on various types.

Various methods are available for the systems of this type, but all of them are required to have the performances such that the physical properties such as viscosity and surface tension are within the range of suitability, the recording agent has a solution satability high enough not to cause clogging of the minute ejection orifice, a recorded image can be obtained in a sufficiently high density, and changes in the values of physical properties, precipitation of solid contents, or the like may not occur during storage.

In addition to the above performances, they are also required to have the properties that the recording can be performed without limitation on the type of recording members, they can achieve a high fixing speed, and they can give a recorded image with excellent water resistance, solvent resistance (resistance to alcohol, in particular), light-resistance, wear resistance, and resolution.

However, recorded images formed using conventional inks, in particular, water-based inks, tend to cause feathering or blur, or color fading, owing to adhesion of water or irradiation by light. This tendency is remarkable particularly in a magenta recording, and inks improved to eliminate these disadvantages have been strongly sought.

For example, Japanese Patent Laid-Open No. 59-78273 discloses an ink comprising a specific monoazo dye having a phenyl group and a naphthyl group.

When a recording is performed on a plain paper by using such an ink, the resulting recorded image can have a light-resistance greatly superior to that of inks comprising a conventional magenta dye, but can not still have a water resistance having reached a level high enough for practical use.

SUMMARY OF THE INVENTION

Accordingly, an object of the present invention is to provide a magenta color ink that has overcome the disadvantages involved in the above prior art.

In other words, it is to provide a recording solution that gives an image superior in tone sharpness, and also superior in light-resistance and water resistance, of the resulting recorded image when recording is performed on a plain paper.

Another object of the present invention is to provide a novel blue ink and a novel red ink that give recorded images having a superior tone brilliancy, light-resistance and water resistance.

The above objects can be attained by the invention described below.

Summarily stated, the present invention provides a recording solution, comprising a recording agent which is a component that forms a recorded image and a liquid medium in which said recording agent is dissolved or dispersed, wherein said recording agent comprises a dye represented by the following Formula

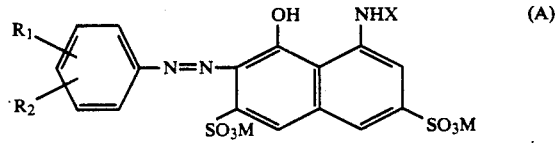

wherein $R_1$ and $R_2$ each represent a substituent; X represents a residual group of an organic acid; and M represents a base selected from the group consisting of an alkali metal group, an ammonium group, and an organic amine group; and at least one dye selected from the group consisting of C.I. Acid Red 131, C.I. Acid Red 274, C.I. Direct Red 227 and C.I. Direct Red 9.

The present invention also provides a recording solution, comprising a recording agent which is a component that forms a recorded image and a liquid medium in which said recording agent is dissolved or dispersed, wherein said recording agent comprises a magenta component and a yellow component said magenta component being composed of a dye represented by the following Formula (A)

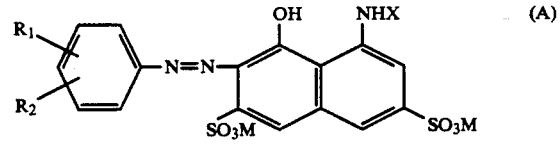

wherein $R_1$ and $R_2$ each represent a substituent; X represents a residual group of an organic acid; and M represents a base selected from the group consisting of an alkali metal group, an ammonium group, and an organic amine group; and C.I. Direct Red 227; said yellow component being composed of at least one of C.I. Direct Yellow 86 and C.I. Direct Yellow 142.

The present invention further provides a recording solution, comprising a recording agent which is a component that forms a recorded image and a liquid medium in which said recording agent is dissolved or dispersed, wherein said recording agent comprises a magenta component and a cyan component, said magenta component being composed of a dye represented by the following Formula (A)

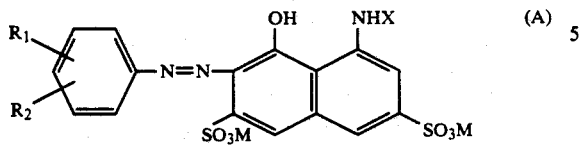

wherein $R_1$ and $R_2$ each represent a substituent; X represents a residual group of an organic acid; and M represents a base selected from the group consisting of an alkali metal group, an ammonium group, and an organic amine group; and C.I. Direct Red 227; said cyan component being composed of at least one selected from the group consisting of C.I. Direct Blue 199, C.I. Direct Blue 86 and C.I. Acid Blue 198.

DETAILED DESCRIPTION OF THE PREFERRED EMBODIMENTS

Figure 1A:
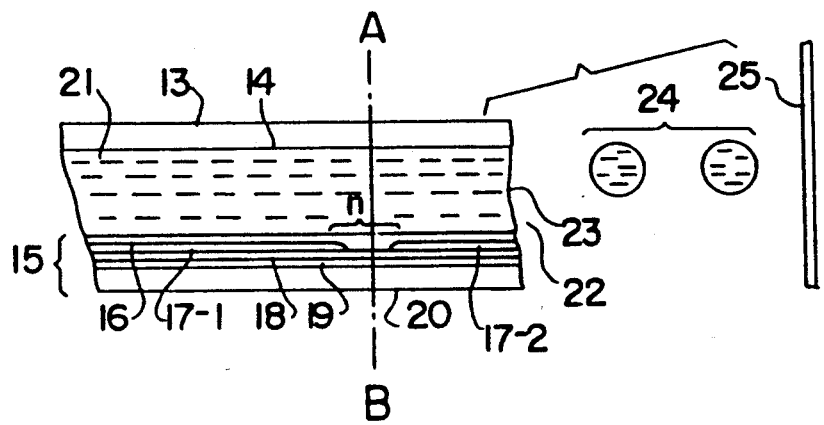
FIGS. 1(a) and 1(b) are respectively a longitudinal sectional view and a cross-sectional view of the head part of an ink jet recording device.

To achieve the objects of the present invention, the present inventors made detailed studies on dyes, the recording agent components of inks, in particular, on magenta dyes. As a result, they found that a specific combination of dyes is preferred as the recording agent of inks, particularly as the recording agent of inks used in the ink-jet systems, and employment of such a specific combination of dyes as the recording agent of inks can bring about an ink capable of giving a recorded image having a very brilliant tone and satisfying the water resistance, light-resistance, resolution, alcohol resistance, and other required performances, when used in the ink-jet systems.

The present invention will now be described below in greater detail by giving preferred embodiments.

The dye represented by the above Formula (A) includes any dyes so long as it is included in the above Formula (A), but particularly preferred examples thereof include the following. These are exemplified as sodium salts, but may also be formed into salts with any bases, such as lithium salts, potassium salts, ammonium salts and organic amine salts.

Exemplary Compound 1

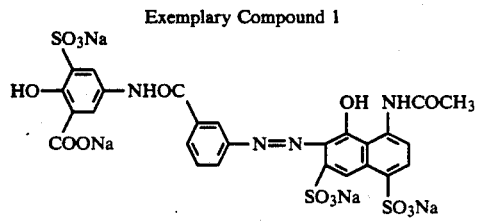

Exemplary Compound 2

Exemplary Compound 3

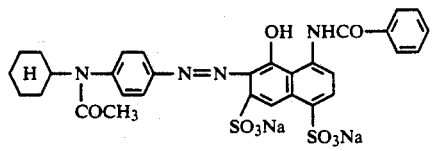

Exemplary Compound 4

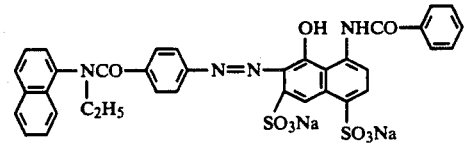

Exemplary Compound 5

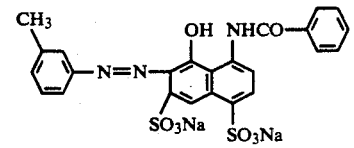

Exemplary Compound 6

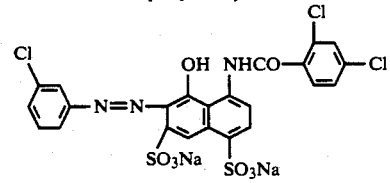

Exemplary Compound 7

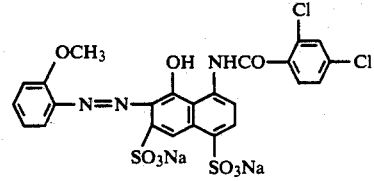

Exemplary Compound 8

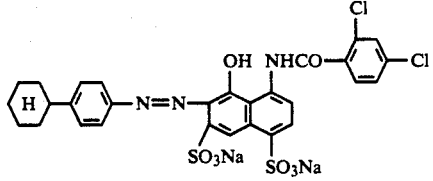

Exemplary Compound 9

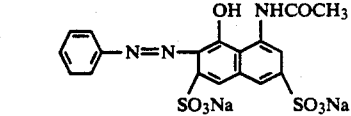

Exemplary Compound 10

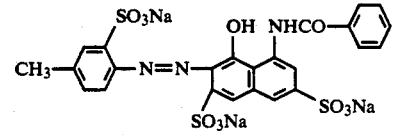

Exemplary Compound 11

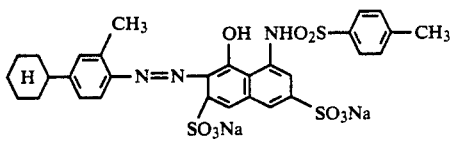

Exemplary Compound 12

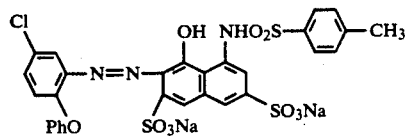

The present invention is mainly characterized by the combination of the dye (A) as described above with at least one selected from the group consisting of C.I. Acid Red 131, C.I. Acid Red 274, C.I. Direct Red 227 and C. I. Direct Red 9, and a magenta ink resulting from such a specific combination can give a recorded image concurrently having very superior tone brilliancy, light-resistance and water resistance as compared with conventional inks of the same kinds of colors.

In particular, a remarkable effect can be obtained when the C. I. Direct Red 227 is selected as the dye used in combination with the dye (A).

The total content of the above dyes is designed according to the type of the liquid medium component and the performances required in inks, but, in general, may be in the range of from 0.1 to 20% by weight, preferably from 0.5 to 15% by weight, and more preferably from 1 to 10% by weight, based on the total weight of an ink. As to the amount of these dyes used, the effect of the present invention can be most remarkably achieved when the dye (A) is used in a proportion of from 20 to 80% by weight, and preferably from 30 to 70% by weight, based on the total weight of the dyes. In addition to these specific dyes, it is of course possible to use other various dyes such as direct dyes and acid dyes in combination.

In particular, as a red ink, the magenta component consisting of the dye (A) and C. I. Direct Red 227, as described above, can be used in combination with a yellow component consisting of any one or both of C. I. Direct Yellow 86 and C. I. Direct Yellow 142, thereby giving a recorded image concurrently having very superior tone brilliancy, light-resistance and water resistance as compared with conventional red inks.

As to the amount of these dyes used, the effect of the present invention can be most remarkably achieved when the dye (A) is used in a proportion of from 10 to 90% by weight, and preferably from 20 to 70% by weight, and C. I. Direct Red 227 is used in a proportion of from 20 to 60% by weight, based on the total weight of the dyes.

As a blue ink, the magenta component consisting of the dye (A) and C. I. Direct Red 227, as described above, can also be used in combination with a cyan component consisting of any one or both of C. I. Direct Blue 199, C. I. Direct Blue 86, and C. I. Acid Blue 198. The ink thus obtained from such a specific combination can give a recorded image concurrently having very superior tone brilliancy, light-resistance and water resistance as compared with conventional blue inks.

As to the amount of these dyes used, the effect of the present invention can be most remarkably achieved when the dye (A) is used in a proportion of from 2 to 50% by weight, and preferably from 5 to 40% by weight, and C. I. Direct Red 227 is used in a proportion of from 5 to 30% by weight, based on the total weight of the dyes.

The solvent preferably used in the ink of the present invention is water or a mixed solvent comprising water and a water soluble organic solvent. Particularly preferred is the mixed solvent comprising water and a water soluble organic solvent, and containing a polyhydric alcohol as the water-soluble organic solvent, which prevents ink drying. As the water, it is preferred not to use common water, containing various ions, but deionized water. The water-soluble organic solvent used by being mixed with water includes, for example, alkyl alcohols having 1 to 4 carbon atoms, such as methyl alcohol, ethyl alcohol, n-propyl alcohol, isopropyl alcohol, n-butyl alcohol, sec-butyl alcohol, tert-butyl alcohol and isobutyl alcohol; amides such as dimethylformamide and dimethylacetamide; ketones or ketoalcohols such as acetone and diacetone alcohol; ethers such as tetrahydrofuran and dioxane; polyalkylene glycol such as polyethylene glycol and polypropylene glycol; alkylene glycols comprising an alkylene group having 2 to 6 carbon atoms, such as ethylene glycol, propylene glycol, butylene glycol, triethylene glycol, 1,2,6-hexanetriol, thiodiglycol, hexylene glycol and diethylene glycol; glycerol; lower alkyl ethers of polyhydric alcohols, such as ethylene glycol methyl or ethyl ether, diethylene glycol methyl or ethyl ether, triethylene glycol methyl or ethyl ether; ureas such as urea, thiourea and ethyleneurea; N-methyl-2-pyrrolidone, and 1,3-dimethyl-2-imidazolidinone.

Of these many water-soluble organic solvents, it is preferred to use a polyhydric alcohol such as ethylene glycol, thiodiglycol or glycerol as a main solvent in combination with an aliphatic monovalent alcohol such as methyl alcohol, ethyl alcohol, isopropyl alcohol or n-butyl alcohol, when taking account of instances in which a recording medium comprises a plain paper.

The above water-soluble organic solvent may be contained in the ink in an amount of generally from 1 to 50% by weight, and preferably from 5 to 30% by weight, based on the total weight of the ink. The content of the water used in the mixed solvent is designed in a vast range, depending on the type of the above organic solvent component, the composition thereof and the desired performances of inks, but should be within the range covering generally from 10 to 95%, and preferably not less than 70%, based on the total weight of the ink.

The ink of the present invention, made up with these components can be an excellent ink well balanced by itself in all the recording performances (such as signal response, droplet-forming stability, ejection stability, long-time continuous recording performance, and ejection stability after long-time stoppage of recording), shelf stability, and fixability to recording mediums, as well as the tone brilliancy, light-resistance, weathering resistance, water resistance and alcohol resistance of recorded images. For the purpose of further improving these performances, all sorts of conventionally known additives may also be further added and contained.

They include, for example, viscosity modifiers such as polyvinyl alcohol, celluloses and water-soluble resins; surface tension modifiers such as all sorts of cationic, anionic or nonionic surface active agents, diethanolamine and triethanolamine; pH adjusters, and mildew-proofing agents.

A specific-resistance modifier such as lithium chloride, ammonium chloride or sodium chloride is also added in order to prepare inks used in ink-jet systems of the type in which the ink is electrostatically charged.

Values of thermal properties (as exemplified by specific heat, thermal expansion coefficient and thermal conductivity) may often be modified in instances where the ink is used in ink-jet systems of the type in which the ink is ejected by the action of thermal energy.

The ink of the present invention, as described above, is useful as inks for use in making records using various writing utensils, recording tools, etc., and particularly useful as inks for use in ink-jet systems. The ink-jet systems mentioned herein include any systems so long as they are systems in which an ink can be effectively released from a nozzle and transmitted to a recording medium serving as a target.

The recording liquid of the present invention is preferably used in the ink jet recording method in which ink droplets are discharged by employing thermal energy. However, the recording solution can also be used for general writing utensils.

An example of the recording apparatus which is preferable for recording by using the ink of the present invention is an apparatus in which ink droplets are produced by applying heat energy to the ink in the chamber of a recording head in correspondence with a recording signal.

Figure 1B:
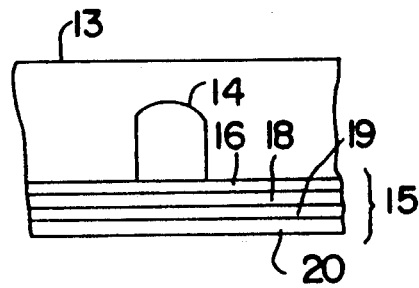
Figure 2:
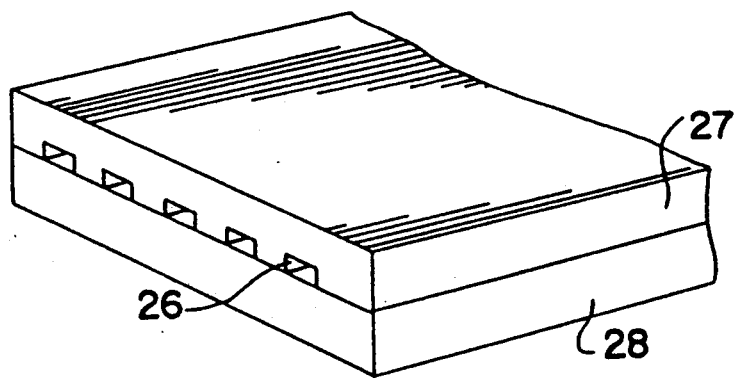
FIG. 2 is a perspective view of the appearance of a multiple head which comprises the head shown in FIG. 1.

FIGS. 1(a), 1(b) and 2 show examples of the structure of a head, which is a principal part of an ink jet recording apparatus.

In the drawings, a head 13 is formed by bonding a glass, ceramic or plastic plate, which has a groove 14 for allowing ink to pass therethrough, and a heating head 15 used for heat-sensitive recording. Although a thin film head is shown in the drawings, the head is not limited to such an embodiment. The heating head 15 comprises a protective film 16 made of silicon oxide or the like, aluminum electrodes 17-1, 17-2, a heating resistor layer 18 made of nichrome or the like, a heat-accumulating layer 19 and a substrate 20 made of aluminum or the like and having good heat radiation properties.

Ink 21 reaches a discharging orifice (micropore) 22 and forms a meniscus 23 at pressure P.

When an electrical signal is applied to the electrodes 17-1, 17-2, a region off the heating head 15, which is denoted by n, rapidly generates heat so as to generate air bubbles in the ink 21 which contacts with the region. The meniscus 23 is projected by the pressure generated, and the ink 21 is discharged as a jet of ink droplets 24 from the orifice 22. The droplets 24 are propelled toward a recording material 25. FIG. 2 shows a multiple head comprising a plurality of the heads shown in FIG. 1(a) which are arranged in parallel. The multi-head is formed by bonding a glass plate 27 having a plurality of grooves 26 and a heating head 28, which is the same as that shown in FIG. 1(a).

FIG. 1(a) is a sectional view taken along the ink flow channel of the ink, and FIG. 1(b) is a sectional view taken along the line A-B in FIG. 1(a).

Figure 3:
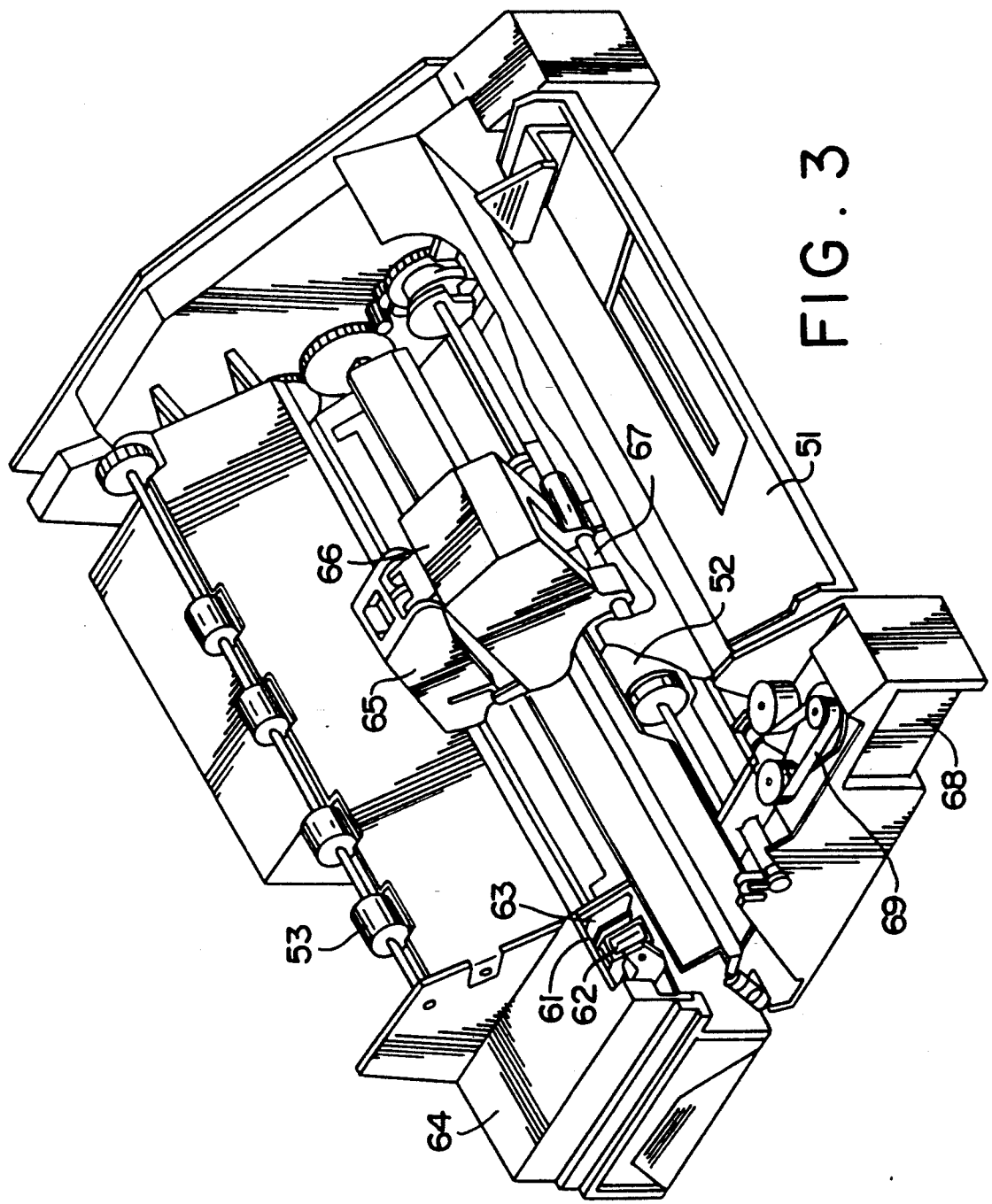
FIG. 3 is a perspective view of an example of an ink jet recording apparatus.

FIG. 3 shows an example of an ink jet recording apparatus in which the head shown in FIG. 1 is incorporated.

In FIG. 3, reference numeral 61 denotes a blade serving as a wiping member in the form of a cantilever in which one end is a fixed end held by a blade holding member. The blade 61 is disposed at a position adjacent to a region of recording by a recording head. In this example, the blade 61 is held in a position in which it projects in the path of the movement of the recording head. Reference numeral 62 denotes a cap which is disposed at a home position adjacent to the blade 61 and which is moved in the direction vertical to the moving direction of the recording head so as to contact with the orifice surface for the purpose of capping. Reference numeral 63 denotes an ink absorber which is disposed at a position adjacent to the blade 61 and which is held in a position in which it projects in the path of the movement of the recording head in the same way as the blade 61. The blade 61, the cap 62 and the absorber 63 form a discharging recovery part 64. Moisture and dust on the ink orifice surface are removed by the blade 61 and the absorber 63.

Reference numeral 65 denotes the ink jet device which has a means for generating discharging energy so as to record an image by discharging the ink to the recording material opposite to the orifice surface having orifices. Reference numeral 66 denotes a carriage for moving the ink jet device 65 which is loaded thereon. The carriage 66 is slidably engaged with a guide shaft 67 and is partially connected (not shown) to a belt 69 which is driven by a motor 68. This permits the carriage 66 to move along the guide shaft 67 and move in the region of recording by the ink jet device 65 and the region adjacent thereto.

Reference numeral 51 denotes a sheet feeding part, and reference numeral 52 denotes a sheet feeding roller which is driven by a motor (not shown). This arrangement allows the recording paper to be fed to a position opposite to the orifice surface of the recording head and to be delivered to a take-off part having a take-off roller 53 during the progress of recording.

In the aforementioned arrangement, when the ink jet device 65 is returned to the home position at the end of recording, the cap 62 is retracted from the path of the movement of the ink jet device 65, while the blade 61 is projected in the path of the movement. As a result, the orifice surface of the ink jet device 65 is wiped by the blade 61. When the cap 62 contacts with the orifice surface of the recording head 65 so as to cap it, the cap 62 is moved so as to project in the path of the movement of the ink jet device 65.

When the ink jet device 65 is moved from the home position to the recording start position, the cap 62 and the blade 61 are at the same positions as the above-described positions in wiping. As a result, the orifice surface of the ink jet device 65 is wiped even during the movement of the ink jet device 65.

The recording head 65 is moved to the home position adjacent to the recording region not only at the end of recording and during the recovery of discharging (the operation of sucking an ink from an orifice in order to recover the normal discharge of an ink from an orifice), but also at predetermined intervals when it is moved in the recording region for the purpose of recording. This movement causes the above-described wiping.

Figure 4:
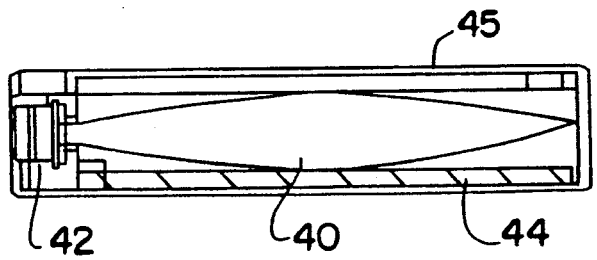
FIG. 4 is a longitudinal sectional view of an ink cartridge.

FIG. 4 is a drawing which shows an example of an ink cartridge 45 for containing the ink to be supplied to the head through an ink supply tube. In the drawing, reference numeral 40 denotes an ink bag for containing the ink to be supplied which has a rubber stopper 42 at its one end. When a needle (not shown) is inserted into the stopper 42, the ink contained in the ink bag 40 can be supplied to the ink jet device 65. Reference numeral 44 denotes an ink absorber for absorbing waste ink. As the ink bag in the present invention, there may preferably be used ones of which the surface coming into contact with the ink is formed from polyolefins, in particular polyethylene.

The ink jet recording apparatus used in the present invention is not limited to an apparatus in which a device and an ink cartridge are separately disposed, as described above. The ink jet device shown in FIG. 5 in which a device and an ink cartridge are integrated can be preferably used in the present invention.

Figure 5:
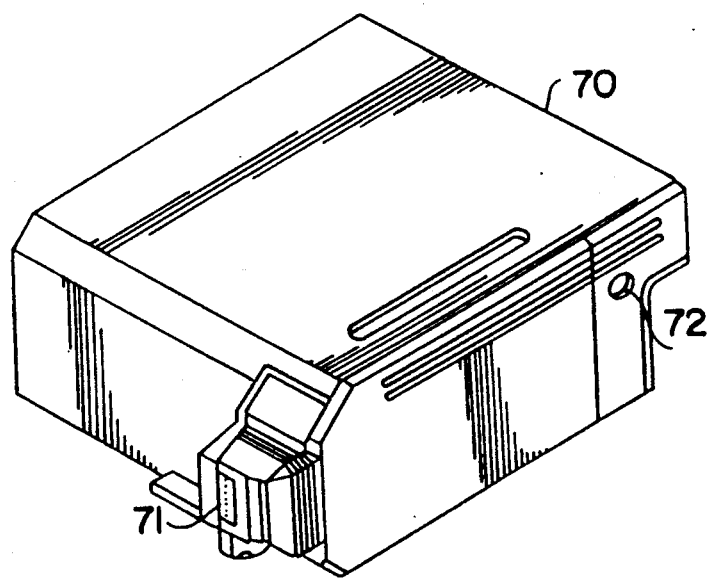
FIG. 5 is a perspective view of an ink jet device.

In FIG. 5, reference numeral 70 denotes an ink jet device which contains an ink storing member impregnated with ink. The ink in the ink storing member is discharged as ink droplets from a head part 71 having a plurality of orifices. Further, as the ink storing member, there may be used an ink absorber on an ink bag. The head is the same as those referred to in FIGS. 1 and 2.

Reference numeral 72 denotes a communicating hole for allowing the inside of the device 70 to communicate with the atmosphere. As a material for the ink absorber in the present invention, there may preferably be used polyurethanes.

The ink jet device 70 is used in place of the ink jet device 65 shown in FIG. 3 and is detachably provided on the carriage 66.

As described above, the ink of the present invention comprises the recording agent comprised of the dyes employed in a specific combination. Thus, it has superior recording performances such as long-term shelf stability, ejection stability and ejection response, also exhibits superior ink-fixing properties when it is applied on a plain paper, and particularly gives a recorded image having superior tone brilliancy, light-resistance and water resistance.

C.I. Direct Red 227 used in this invention has following features:

(1) Upon a visible ray spectrum (wave length 400–700 $\mu$m) and a tone measurements by spectrophotometer for an aqueous solution having a dye concentration of 20 ppm, a peak of a wave length of around 540 $\mu$m is found. The height is 0.68–0.78 and the CIEL*a*b* value is L*: 74–77, a*: 57–60 and b*: $-12$–$-15$.

(2) The Rf value by means of a thin layer chromatography (at center of a spot) is 0.30–0.34, when an eluting solution of n-BuOH/pyridine/aqueous ammonia/water=8/4/4/3 is used.

EXAMPLES

The present invention will be described below in greater detail by giving Examples and Comparative Examples. In the following, "part(s)" is by weight unless particularly mentioned.

Magenta ink

EXAMPLE 1

| | |
|---|---|
| Exemplary Compound 4 | 0.4 part |
| C.I. Acid Red 131 | 1.6 parts |
| Diethylene glycol | 13 parts |
| Ethylene glycol | 5 parts |
| Ion exchanged water | 80 parts |

The above components were thoroughly mixed and dissolved in a vessel, and the solution was pressure-filtered using a Teflon filter having a pore diameter of 0.45 $\mu$m, followed by deaeration treatment using a vacuum pump to obtain an ink of the present invention.

EXAMPLES 2 TO 4

Example 1 was repeated to obtain inks of the present invention, except that the following dyes were respectively used as the dye in Example 1.

EXAMPLE 2

| | |
|---|---|
| Exemplary Compound 6 | 0.8 parts |
| C.I. Acid red 274 | 1.2 parts |

EXAMPLE 3

| | |
|---|---|
| Exemplary Compound 9 | 0.8 parts |
| C.I. Direct Red 227 | 1.2 parts |

EXAMPLE 4

| | |
|---|---|
| Exemplary Compound 10 | 1.1 parts |
| C.I. Direct Red 9 | 0.9 parts |

COMPARATIVE EXAMPLES 1 TO 8

Example 1 was repeated to obtain inks of the comparative examples, except that the following dyes were respectively used as the dye in Example 1.

COMPARATIVE EXAMPLE 1

| | |
|---|---|
| Exemplary Compound 4 | 2 parts |

COMPARATIVE EXAMPLE 2

| | |
|---|---|
| Exemplary Compound 6 | 2 parts |

COMPARATIVE EXAMPLE 3

| | |
|---|---|
| Exemplary Compound 9 | 2 parts |

COMPARATIVE EXAMPLE 4

| | |
|---|---|
| Exemplary Compound 10 | 2 parts |

COMPARATIVE EXAMPLE 5

| | |
|---|---|
| C.I. Acid Red 131 | 2 parts |

COMPARATIVE EXAMPLE 6

| | |
|---|---|
| C.I. Acid Red 274 | 2 parts |

COMPARATIVE EXAMPLE 7

| | |
|---|---|
| C.I. Direct Red 227 | 2 parts |

COMPARATIVE EXAMPLE 8

| | |
|---|---|
| C.I. Direct Red 9 | 2 parts |

Using the inks of Examples and Comparative Examples, obtained in the above, recordings were performed on Xerox 4024 papers by use of a recording apparatus having a recording head of an on-demand system in which ink is ejected by the operation of a piezoelectric oscillator (ejection orifice diameter: 50 μm; piezoelectric oscillator driving voltage: 80 V; frequency: 3 KHz), to obtain the results as shown in the following Table 1.

TABLE 1

| Ink | Light-resistance | Water resistance | Tone |
|---|---|---|---|
| Example: | | | |
| 1 | A | A | A |
| 2 | A | A | A |
| 3 | A | A | A |
| 4 | A | A | A |
| Comparative Example: | | | |
| 1 | A | C | A |
| 2 | A | C | A |
| 3 | A | C | A |
| 4 | A | C | A |
| 5 | C | A | C |
| 6 | C | A | C |
| 7 | C | A | C |
| 8 | C | A | C |

In the above, the light-resistance was based on the ΔE (CIEL*a*b*) after irradiation for 20 hours using Atlas Xenon Fadeometer, and evaluated as A for 0 to 10, as B for 11 to 20, and as C for more than 20.

The water resistance was based on the O.D. residual rate (%) after immersion for 5 minutes in water, and evaluated as A for 80 to 100%, as B for 65 to 79%, and as C for less than 65%.

The tone was based on visual observation, and evaluated as A for a brilliant magenta color, as B for a slightly dark magenta color, and as C for a color deviated from the tone of a magenta color.

Blue ink

EXAMPLE 5

| | |
|---|---|
| Exemplary Compound 9 | 0.25 part |
| C.I. Direct Red 227 | 0.25 part |
| C.I. Direct Blue 199 | 1.5 parts |
| Glycerol | 3 parts |
| Thiodiglycol | 7 parts |
| Isopropyl alcohol | 3 parts |
| Ion-exchanged water | 85 parts |

The above components were stirred thoroughly, followed by pressure filtration using Fluorobore Filter (trademark of a filter manufactured by Sumitomo Electric Industries, Ltd.) having a pore size of 0.45 μm, to obtain an ink of the present invention.

EXAMPLES 6 TO 9, COMPARATIVE EXAMPLES 9 TO 13

Example 5 was repeated to obtain inks of the present invention and the comparative examples, except that the following components were used in the same way as Example 5.

EXAMPLE 6

| | |
|---|---|
| Exemplary Compound 4 | 0.3 part |
| C.I. Direct Red 227 | 0.4 part |
| C.I. Direct Blue 86 | 1.8 parts |
| Urea | 5 parts |
| Ethyl alcohol | 5 parts |
| Ion-exchanged water | 87.5 parts |

EXAMPLE 7

| | |
|---|---|
| Exemplary Compound 6 | 0.2 part |
| C.I. Direct Red 227 | 0.3 part |
| C.I. Acid Blue 198 | 1.5 parts |
| Glycerol | 6 parts |
| Thiodiglycol | 14 parts |
| Ethyl alcohol | 5 parts |
| Ion-exchanged water | 73.0 parts |

EXAMPLE 8

| | |
|---|---|
| Exemplary Compound 9 | 0.4 part |
| C.I. Direct Red 227 | 0.4 part |
| C.I. Direct Blue 199 | 2.4 parts |
| Glycerol | 10 parts |
| Ethyl alcohol | 3 parts |
| Ion-exchanged water | 83.8 parts |

EXAMPLE 9

| | |
|---|---|
| Exemplary Compound 10 | 0.6 part |
| C.I. Direct Red 227 | 0.4 part |
| C.I. Direct Blue 199 | 0.6 part |
| C.I. Acid Blue 198 | 0.2 part |
| C.I. Direct Blue 86 | 0.5 part |
| Diethylene glycol | 10 parts |
| Ethylene glycol | 5 parts |
| Ion-exchanged water | 82.7 parts |

COMPARATIVE EXAMPLE 9

Having the same composition as Example 5 except that the following dyes were used in place of the dye used in Example 5.

| | |
|---|---|
| Exemplary Compound 9 | 0.25 part |
| C.I. Direct Red 227 | 0.25 part |
| C.I. Acid Blue 9 | 1.5 parts |

COMPARATIVE EXAMPLE 10

Having the same composition as Example 6 except that the following dyes were used in place of the dye used in Example 6.

| | |
|---|---|
| Exemplary Compound 4 | 0.7 part |

-continued

| C.I. Direct Blue 86 | 1.8 parts |
|---|---|

COMPARATIVE EXAMPLE 11

Having the same composition as Example 7 except that the following dyes were used in place of the dye used in Example 7.

| C.I. Direct Red 227 | 0.5 part |
|---|---|
| C.I. Acid Blue 198 | 1.5 parts |

COMPARATIVE EXAMPLE 12

Having the same composition as Example 8 except that the following dye was used in place of the dye used in Example 8.

| C.I. Direct Blue 199 | 3.2 part |
|---|---|

COMPARATIVE EXAMPLE 13

Having the same composition as Example 9 except that the following dyes were used in place of the dye used in Example 9.

| C.I. Direct Red 227 | 1.0 parts |
|---|---|
| C.I. Direct Blue 86 | 1.3 parts |

The inks of the above Examples 5 to 9 and Comparativen Examples 9 to 13 were each set in a recording apparatus having a multi-head of an on-demand system in which recording is performed by applying heat energy to the ink in the recording head to cause ink droplets to fly (ejection orifice diameter: 50×40 μm; driving voltage: 30 V; frequency: 4 KHz), and recordings were performed on Xerox 4024 copy papers. The recorded images were air-dried indoors for 4 hours, and evaluated for the water resistance, light-resistance and tone. Results obtained are shown in the following Table 2.

TABLE 2

| Ink | Light resistance | Water resistance | Tone |
|---|---|---|---|
| Example: | | | |
| 5 | A | A | A |
| 6 | A | A | A |
| 7 | A | A | A |
| 8 | A | A | A |
| 9 | A | A | A |
| Comparative Example: | | | |
| 9 | C | C | A |
| 10 | B | C | A |
| 11 | B | A | C |
| 12 | A | A | C |
| 13 | A | A | B |

EXAMPLE 10

| Exemplary Compound 9 | 0.8 part |
|---|---|
| C.I. Direct Red 227 | 0.8 part |
| C.I. Direct Yellow 86 | 0.4 part |
| Glycerol | 3 parts |
| Thiodiglycol | 7 parts |
| Isopropyl alcohol | 3 parts |

-continued

| Ion-exchanged water | 85 parts |
|---|---|

The above components were stirred thoroughly, followed by pressure filtration using Fluorobore Filter (trademark of a filter manufactured by Sumitomo Electric Industries, Ltd.) having a pore size of 0.45 μm, to obtain an ink of the present invention.

EXAMPLES 11 TO 14, COMPARATIVE EXAMPLES 14 TO 18

Example 10 was repeated to obtain inks of the present invention and the comparative examples, except that the following components were used in the same way as Example 10.

EXAMPLE 11

| Exemplary Compound 4 | 1.0 parts |
|---|---|
| C.I. Direct Red 227 | 1.0 part |
| C.I. Direct Yellow 142 | 0.5 part |
| Urea | 5 parts |
| Ethyl alcohol | 5 parts |
| Ion-exchanged water | 87.5 parts |

EXAMPLE 12

| Exemplary Compound 9 | 0.9 part |
|---|---|
| C.I. Direct Red 227 | 0.8 part |
| C.I. Direct Yellow 86 | 0.3 part |
| C.I. Direct Yellow 142 | 0.1 part |
| Glycerol | 10 parts |
| Ethyl alcohol | 2 parts |
| Ion-exchanged water | 85.9 parts |

EXAMPLE 13

| Exemplary Compound 6 | 1.2 parts |
|---|---|
| C.I. Direct Red 227 | 1.0 part |
| C.I. Direct Yellow 86 | 0.5 part |
| Glycerol | 6 parts |
| Thiodiglycol | .14 parts |
| Ethyl alcohol | 5 parts |
| Ion-exchanged water | 72.3 parts |

EXAMPLE 14

| Exemplary Compound 10 | 1.3 parts |
|---|---|
| C.I. Direct Red 227 | 0.7 part |
| C.I. Direct Yellow 142 | 0.3 part |
| Diethylene glycol | 10 parts |
| Ethylene glycol | 5 parts |
| Ion-exchanged water | 82.7 parts |

COMPARATIVE EXAMPLE 14

Having the same composition as Example 10 except that Exemplary Compound 9 only was used in place of all the dyes in Example 10.

COMPARATIVE EXAMPLE 15

Having the same composition as Example 11 except that Exemplary Compound 4 only was used in place of all the dyes in Example 11.

COMPARATIVE EXAMPLE 16

Having the same composition as Example 12 except that C.I. Direct Red 227 only was used in place of all the dyes in Example 12.

COMPARATIVE EXAMPLE 17

Having the same composition as Example 13 except that 2.2 parts of C.I. Direct Red 9 and 0.5 part of C.I. Acid Yellow 23 were used in place of all the dyes in Example 13.

COMPARATIVE EXAMPLE 18

Having the same composition as Example 14 except that 2 parts of C.I. Acid Red 131 and 0.3 part of C.I. Acid Yellow 23 were used in place of all the dyes in Example 13.

The inks of Examples 10 to 14 and Comparative Examples 14 to 18 were each set in the recording apparatus as used in Example 5, and the water resistance, light-resistance and tone were evaluated in the same manner as Example 5. Results obtained are shown in the following Table 3.

TABLE 3

| Ink | Light resistance | Water resistance | Tone |
| --- | --- | --- | --- |
| Example: | | | |
| 10 | A | A | A |
| 11 | A | A | A |
| 12 | A | A | A |
| 13 | A | A | A |
| 14 | A | A | A |
| Comparative Example: | | | |
| 14 | B | C | A |
| 15 | B | C | A |
| 16 | C | A | B |
| 17 | C | C | B |
| 18 | C | C | B |

Further, with respect to each ink in Examples 1 to 14, the ink absorber of the ink-jet device as shown in FIG. 5 was impregnated with the ink. Then the ink-jet apparatus as shown in FIG. 3 was allowed to carry the ink-jet device. By use of the ink-jet apparatus, recording was performed. As a result, good recording which was excellent in a discharge property could be realized.

We claim:

1. A recording liquid, comprising a recording agent which is a component that forms a recorded image and a liquid medium in which said recording agent is dissolved or dispersed, wherein said recording agent comprises a dye represented by the Formula (A)

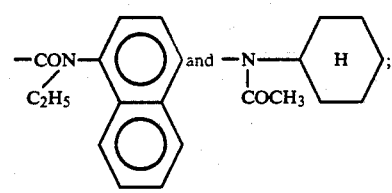

wherein $R_1$ and $R_2$ are independently selected from the group consisting of a hydrogen atom, a methyl group, a methoxy group, a chloro group, a sulfonic acid group,

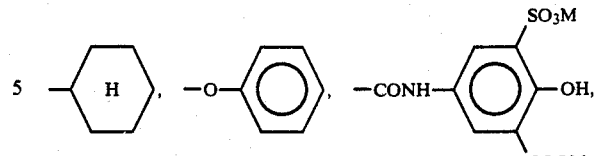

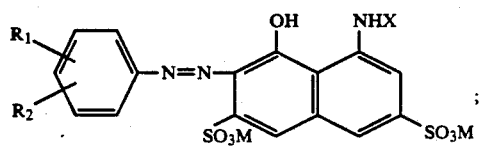

X represents a residual group of an organic acid; and M represents a base selected from the group consisting of an alkali metal group, an ammonium group, and an organic amine group; and at least one dye selected from the group consisting of C.I. Acid Red 131, C.I. Acid Red 274, C.I. Direct Red 227 and C.I. Direct Red 9, and wherein said dye represented by Formula (A) comprises 20% to 80% of the total weight of the recording agents.

2. The recording liquid according to claim 1, wherein said recording agent comprises the dye represented by Formula (A) and C.I. Direct Red 227.

3. The recording liquid according to claim 1, wherein said dye represented by Formula (A) is contained in an amount of from 30 to 70% by weight based on the total weight of the recording agents.

4. A recording liquid comprising a recording agent which is a component that forms a recorded image and a liquid medium in which said recording agent is dissolved or dispersed, wherein said recording agent comprises a magenta component and a yellow component, said magenta component being composed of a dye represented by the Formula (A),

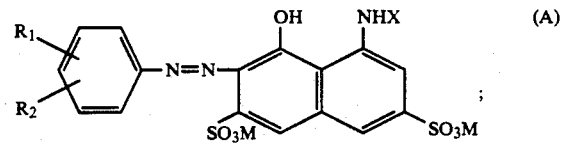

wherein $R_1$ and $R_2$ are independently selected from the group consisting of a hydrogen atom, a methyl group, a methoxy group, a chloro group, a sulfonic acid group,

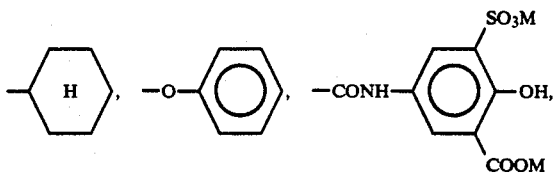

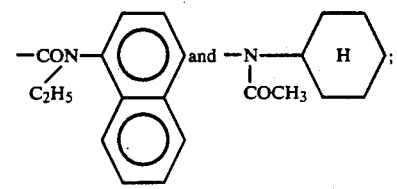

X represents a residual group of an organic acid; and M represents a base selected from the group consisting of an alkali metal group; an ammonium group, and an organic amine group; and C.I. Direct Red 227; said yellow component being composed of at least one of C.I. Direct Yellow 86 and C.I. Direct Yellow 142, wherein the dye represented by Formula (A) comprises 20% to 70% of the total weight of the recording agents and C.I. Direct Red 227 comprises 20% to 60% of the total weight of the recording agents.

5. The recording liquid according to claim 4, which is used in a recording system in which recording is performed by applying a heat energy corresponding to a recording signal, to a recording solution in the room of a recording head, said energy causing ink droplets to fly onto a recording surface.

6. The recording liquid according to claim 4, wherein said liquid medium comprises a polyhydric alcohol or an aliphatic monovalent alcohol.

7. The recording liquid according to claim 6, wherein said polyhydric alcohol is at least one selected from the group consisting of ethylene glycol, thiodiglycol and glycerol.

8. The recording liquid according to claim 6, wherein said aliphatic monovalent alcohol is selected from the group consisting of methyl alcohol, ethyl alcohol, isopropyl alcohol and n-butyl alcohol.

9. A recording liquid comprising a recording agent which is a component that forms a recorded image and a liquid medium in which said recording agent is dissolved or dispersed, wherein said recording agent comprises a magenta component and a cyan component, said magenta component being composed of a dye represented by the Formula (A)

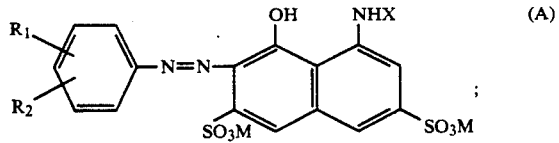

wherein $R_1$ and $R_2$ are independently selected from the group consisting of a hydrogen atom, a methyl group, a methoxy group, a chloro group, a sulfonic acid group,

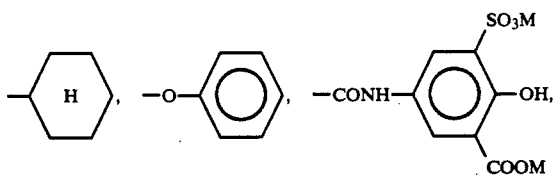

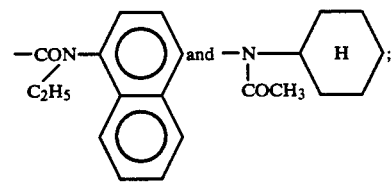

X represents a residual group of an organic acid; and M represents a base selected from the group consisting of an alkali metal group, an ammonium group, and an organic amine group; and C.I. Direct Red 227; said cyan component being composed of at least one selected from the group consisting of C.I. Direct Blue 199, C.I. Direct Blue 86 and C.I. Acid Blue 198, wherein the dye represented by Formula (A) comprises 2% to 50% of the total weight of the recording agents, and wherein C.I. Direct Red 227 comprises 5% to 30% of the total weight of the recording agents.

10. The recording liquid according to claim 9, which is used in a recording system in which recording is performed by applying a heat energy corresponding to a recording signal, to a recording solution in the room of a recording head, said energy causing ink droplets to fly onto a recording surface.

11. The recording liquid according to claim 9, wherein said dye represented by Formula (A) holds from 5 to 40% by weight in the whole recording agents.

12. The recording liquid according to claim 9, wherein said liquid medium comprises a polyhydric alcohol or an aliphatic monovalent alcohol.

13. The recording liquid according to claim 12, wherein said polyhydric alcohol is at least one selected from the group consisting of ethylene glycol, thiodiglycol and glycerol.

14. The recording solution according to claim 12, wherein said aliphatic monovalent alcohol is selected from the group consisting of methyl alcohol, ethyl alcohol, isopropyl alcohol and n-butyl alcohol.

15. The recording liquid according to claim 1, in combination with a recording system for performing recording comprising: a recording head and means for applying heat energy corresponding to a recording signal, to the recording liquid in the recording head, said energy causing droplets of the recording liquid to fly onto a recording surface.

16. The recording liquid according to claim 1, wherein said liquid medium comprises a polyhydric alcohol or an aliphatic monovalent alcohol.

17. The recording liquid according to claim 16, wherein said polyhydric alcohol is at least one selected from the group consisting of ethylene glycol, thiodiglycol, and glycerol.

18. The recording liquid according to claim 1, wherein said liquid medium contains water and a water-soluble organic solvent.

19. The recording liquid according to claim 18, wherein the content of said water is in the range of 10-95% by weight of the recording liquid.

20. The recording liquid according to claim 18, wherein the content of said water is in the range of 70-95% by weight of the recording liquid.

21. The recording liquid according to claim 18, wherein the content of said water-soluble organic solvent is in the range of 1-50% by weight of the recording liquid.

22. The recording liquid according to claim 18, wherein the content of said water-soluble organic solvent is in the range of 5-30% by weight of the recording liquid.

23. The recording liquid according to claim 4, wherein said liquid medium contains water and a water-soluble organic solvent.

24. The recording liquid according to claim 23, wherein the content of said water is in the range of 10-95% by weight of the recording liquid.

25. The recording liquid according to claim 23, wherein the content of said water is in the range of 70-95% by weight of the recording liquid.

26. The recording liquid according to claim 23, wherein the content of said water-soluble organic solvent is in the range of 1-50% by weight of the recording liquid.

27. The recording liquid according to claim 23, wherein the content of said water-soluble organic solvent is in the range of 5-30% by weight of the recording liquid.

28. The recording liquid according to claim 9, wherein said liquid medium contains water and a water-soluble organic solvent.

29. The recording liquid according to claim 28, wherein the content of said water is in the range of 10-95% by weight of the recording liquid.

30. The recording liquid according to claim 28, wherein the content of said water is in the range of 70-95% by weight of the recording liquid.

31. The recording liquid according to claim 28, wherein the content of said water-soluble organic solvent is in the range of 1-50% by weight of the recording liquid.

32. The recording liquid according to claim 28, wherein the content of said water-soluble organic solvent is in the range of 5-30% by weight of the recording liquid.

33. An ink jet recording method for performing color recording, comprising the step of imparting liquid droplets of a recording liquid onto a recording medium, wherein said recording liquid comprises in combination: at least one of C. I. Acid Red 131, C. I. Acid Red 274, C. I. Direct Red 227 and C. I. Direct Red 9; and a dye represented by the formula (A)

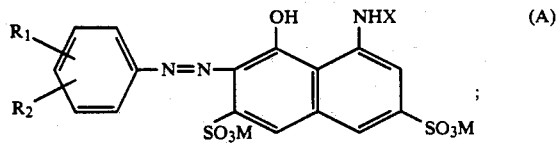

wherein $R_1$ and $R_2$ are independently selected from the group consisting a hydrogen atom, a methyl group, a methoxy group, a chloro group, a sulfonic acid group,

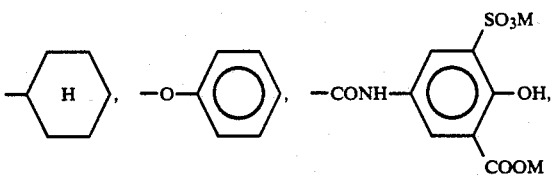

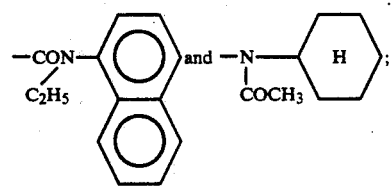

X is a residual group of an organic acid; and M is a base selected from the group consisting of an alkali metal group, an ammonium group, and an organic amine group; and said recording medium is plain paper.

34. The ink jet recording method according to claim 33, wherein said imparting step is performed with an on-demand type of ink jet system.

35. The ink jet recording method according to claim 33; further comprising the step of applying heat energy to the recording liquid to form the liquid droplets.

36. An ink jet recording method for performing color recording, comprising the step of imparting liquid droplets of a recording liquid onto a recording medium, wherein said recording liquid comprises: a magenta component and a yellow component, wherein said magenta component is composed of a dye represented by the formula (A)

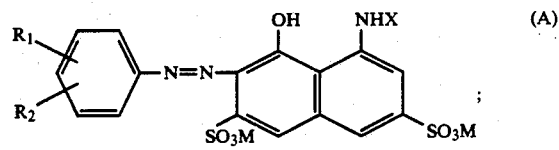

wherein $R_1$ and $R_2$ are independently selected from the group consisting of a hydrogen atom, a methyl group, a methoxy group, a chloro group, a sulfonic acid group,

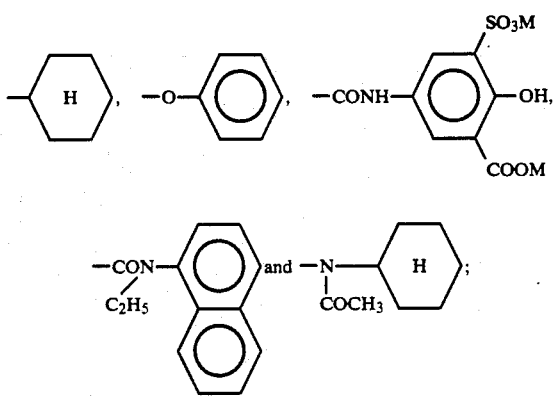

X is a residual group of an organic acid; and M is a base selected from the group consisting of an alkali metal group, an ammonium group, and an organic amine group; and C.I. Direct Red 227; wherein said yellow component is composed of at least one of C.I. Direct Yellow 86 and C.I. Direct Yellow 142; and wherein said recording medium is plain paper.

37. The ink jet recording method according to claim 36, wherein said imparting step is performed with an on-demand type of ink jet system.

38. The ink jet recording method according to claim 36, further comprising the step of applying heat energy to the recording liquid to form the liquid droplets.

39. An ink jet recording method for performing color recording, comprising the step of imparting liquid droplets of a recording liquid onto a recording medium, wherein said recording liquid comprises: a magenta component and a cyan component, wherein said magenta component is composed of a dye represented by the formula (A)

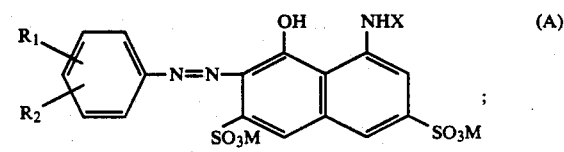

wherein $R_1$ and $R_2$ are independently selected from the group consisting of a hydrogen atom, a methyl group, a methoxy group, a chloro group, a sulfonic acid group,

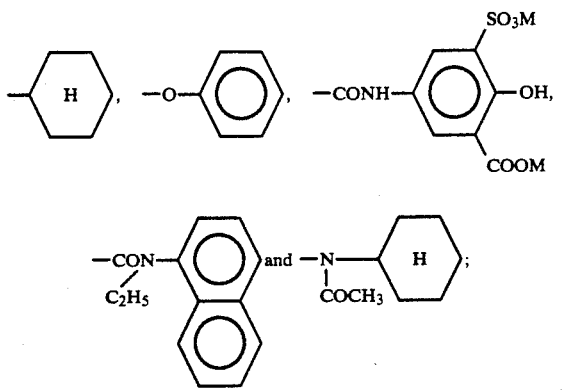

X is a residual group of an organic acid; and M is a base selected from the group consisting of an alkali metal group, an ammonium group, and an organic amine group; and C.I. Direct Red 227; wherein said cyan component is composed of at least one of C.I. Direct Blue 199, C.I. Blue 86 and C.I. Acid Blue 198; and wherein said recording medium is plain paper.

40. The ink jet recording method according to claim 39, wherein said imparting step is performed with an on-demand type of ink jet system.

41. The ink jet recording method according to claim 39, further comprising the step of applying heat energy to the recording liquid to form the liquid droplets.

42. An ink jet device comprising an ink storing member impregnated with a recording liquid comprising
    in combination: at least one of C.I. Acid Red 131, C.I. Acid Red 274, C.I. Direct Red 227 and C.I. Direct Red 9; and a dye represented by the formula (A),

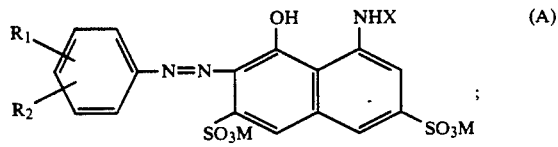

wherein $R_1$ and $R_2$ are independently selected from the group consisting a hydrogen atom, a methyl group, a methoxy group, a chloro group, a sulfonic acid group,

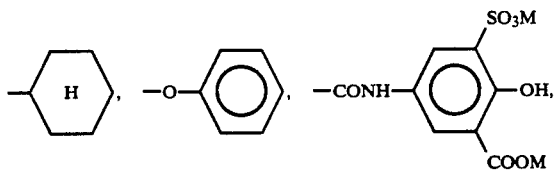

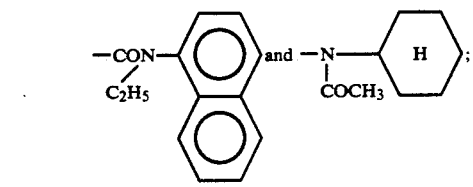

X is a residual group of an organic acid; and M is a base selected from the group consisting of an alkali metal group, an ammonium group, and an organic amine group; "wherein said dye represented by the Formula (A) comprises 20% to 80% of the total weight of the dyes;" and
    a head having a plurality of orifices for discharging said ink as ink droplets.

43. An ink jet device according to claim 42, wherein said ink storing member is an ink absorber or an ink bag.

44. An ink jet device according to claim 42, wherein said head has a heating head to provide to said ink a heat energy for discharging ink droplets.

45. An ink jet device comprising an ink storing member impregnated with a recording liquid comprising
    a magenta component and a yellow component, wherein said magenta component is composed of a dye represented by the formula (A),

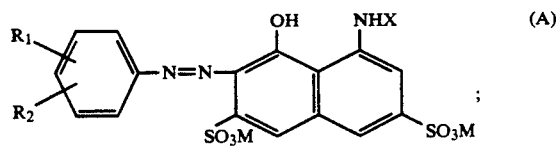

wherein $R_1$ and $R_2$ are independently selected from the group consisting of a hydrogen atom, a methyl group, a methoxy group, a chloro group, a sulfonic acid group,

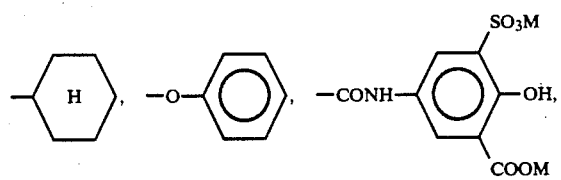

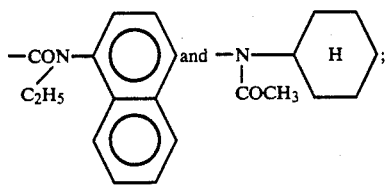

X is a residual group of an organic acid; and M is a base selected from the group consisting of an alkali metal group, an ammonium group, and an organic amine group; and C.I. Direct Red 227; wherein said yellow component is composed of at least one of C.I. Direct Yellow 86 and C.I. Direct Yellow 142; wherein the dye represented by the Formula (A) comprises 20% to 70% of the total weight of the dyes and C.I. Direct Red 227 comprises 20% to 60% of the total weight of the dyes; and
    a head having a plurality of orifices for discharging said ink as ink droplets.

46. An ink device according to claim 45, wherein said ink storing member is an ink absorber or an ink bag.

47. An ink jet device according to claim 45, wherein said head has a heating head to provide to said ink a heat energy for discharging ink droplets.

48. An ink jet device comprising an ink storing member impregnated with a recording liquid comprising
    a magenta component and a cyan component, wherein said magenta component is composed of a dye represented by the formula (A)

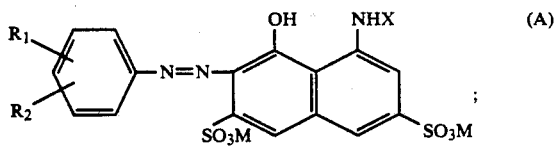

wherein $R_1$ and $R_2$ are independently selected from the group consisting of a hydrogen atom, a methyl group, a methoxy group, a chloro group, a sulfonic acid group,

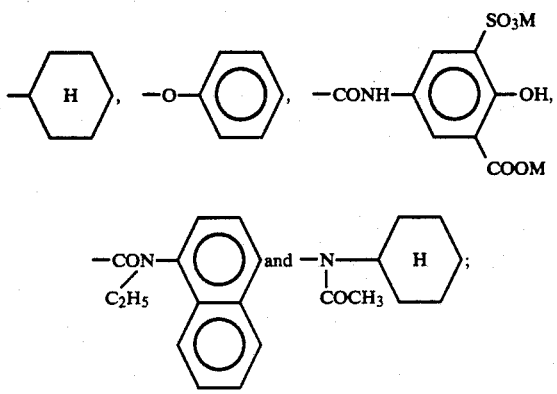

X is a residual group of an organic acid; and M is a base selected from the group consisting of an alkali metal group, an ammonium group, and an organic amine group; and C.I. Direct Red 227; wherein said cyan component is composed of at least one of C.I. Direct Blue 199, C.I. Direct Blue 86 and C.I. Acid Blue 198; wherein the dye represented by the Formula (A) comprises 2% to 50% of the total weight of the dyes, and wherein C.I. Direct Red 227 comprises 5% to 30% of the total weight of the dyes; and a head having a plurality of orifices for discharging said ink as ink droplets.

49. An ink jet device according to claim 48, wherein said ink storing member is an ink absorber or an ink bag.

50. An ink jet device according to claim 48, wherein said head has a heating head to provide to said ink a heat energy for discharging ink droplets.

51. An ink jet recording apparatus comprising an ink jet device comprising an ink storing member impregnated with a recording liquid comprising in combination: at least one of C.I. Acid Red 131, C.I. Acid Red 274, C.I. Direct Red 227 and C.I. Direct Red 9; and a dye represented by the formula (A)

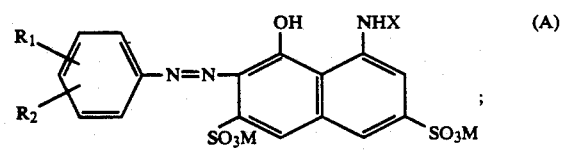

wherein $R_1$ and $R_2$ are independently selected from the group consisting of a hydrogen atom, a methyl group, a methoxy group, a chloro group, a sulfonic acid group,

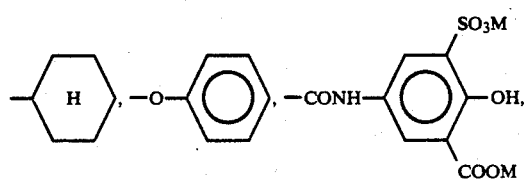

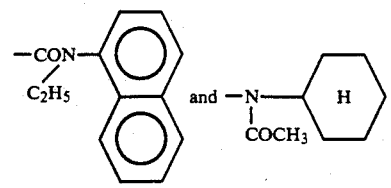

X is a residual group of an organic acid; and M is a base selected from the group consisting of an alkali metal group, an ammonium group, and an organic amine group; wherein said dye represented by the Formula (A) comprises 20% to 80% of the total weight of the dyes; and a head having a plurality of orifices for discharging said ink as ink droplets.

52. An ink jet recording apparatus according to claim 51, wherein said ink storing member is an ink absorber or an ink bag.

53. An ink jet recording apparatus according to claim 51, wherein said head has a heating head to provide to said ink a heat energy for discharging ink droplets.

54. An ink jet recording apparatus comprising an ink jet device comprising an ink storing member impregnated with a recording liquid comprising a magenta component and a yellow component, wherein said magenta component is composed of a dye represented by the formula (A),

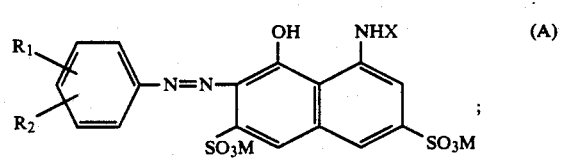

wherein $R_1$ and $R_2$ are independently selected from the group consisting of a hydrogen atom, a methyl group, a methoxy group, a chloro group, a sulfonic acid group,

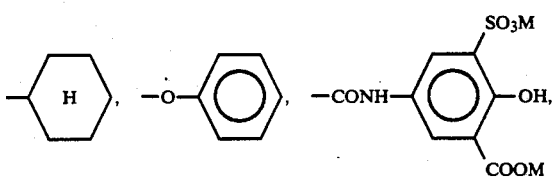

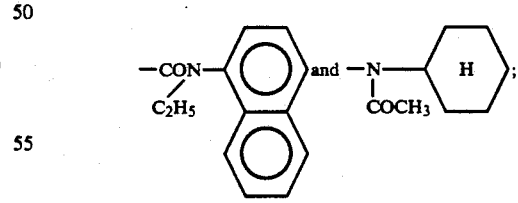

X is a residual group of an organic acid; and M is a base selected from the group consisting of an alkali metal group, an ammonium group, and an organic amine group; and C.I. Direct Red 227; wherein said yellow component is composed of at least one of C.I. Direct Yellow 86 and C.I. Direct Yellow 142; wherein the dye represented by the Formula (A) comprises 20% to 70% of the total weight of the dyes and C.I. Direct Red 227 comprises 20% to 60% of the total weight of the dyes; and a head having a plurality of orifices for discharging said ink as ink droplets.

55. An ink jet recording apparatus according to claim 54, wherein said ink storing member is an ink absorber or an ink bag.

56. An ink jet recording apparatus according to claim 54, wherein said head has a heating head to provide to said ink a heat energy for discharging ink droplets.

57. An ink jet recording apparatus comprising an ink jet device comprising an ink storing member impregnated with a recording liquid comprising a magenta component and a cyan component, wherein said magenta component is composed of a dye represented by the formula (A),

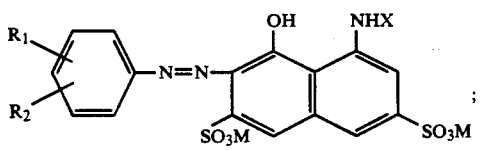

wherein $R_1$ and $R_2$ are independently selected from the group consisting of a hydrogen atom, a methyl group, a methoxy group, a chloro group, a sulfonic acid group,

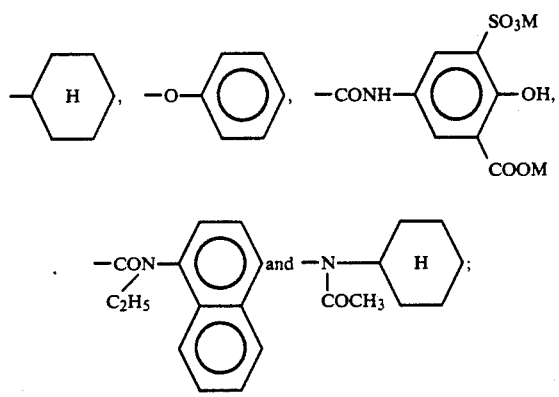

X is a residual group of an organic acid; and M is a base selected from the group consisting of an alkali metal group, an ammonium group, and an organic amine group; and C.I. Direct Red 227; wherein said cyan component is composed of at least one of C.I. Direct Blue 199, C.I. Direct Blue 86 and C.I. Acid Blue 198; wherein the dye represented by the Formula (A) comprises 2% to 50% of the total weight of the dyes, and wherein C.I. Direct Red 227 comprises 5% to 30% of the total weight of the dyes; and a head having a plurality of orifices for discharging said ink as ink droplets.

58. An ink jet recording apparatus according to claim 57, wherein said ink storing member is an ink absorber or an ink bag.

59. An ink jet recording apparatus according to claim 57, wherein said head has a heating head to provide to said ink a heat energy for discharging ink droplets.

60. An ink cartridge comprising an ink bag impregnated with a recording liquid comprising in combination: at least one of C.I. Acid Red 131, C.I. Acid Red 274, C.I. Direct Red 227 and C.I. Direct Red 9; and a dye represented by the formula (A),

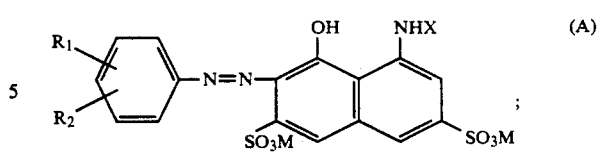

wherein $R_1$ and $R_2$ are independently selected from the group consisting a hydrogen atom, a methyl group, a methoxy group, a chloro group, a sulfonic acid group,

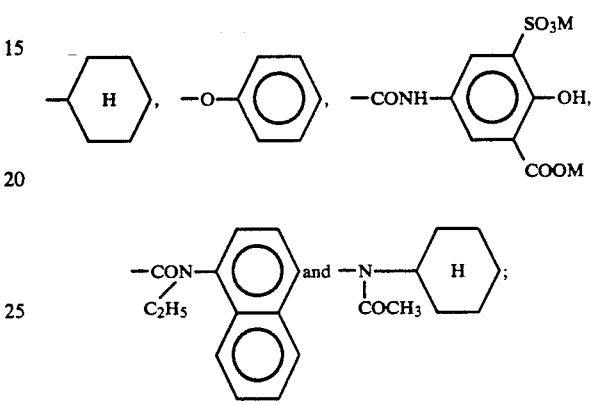

X is a residual group of an organic acid; and M is a base selected from the group consisting of an alkali metal group, an ammonium group, and an organic amine group wherein said dye represented by the Formula (A) comprises 20% to 80% of the total weight of the dyes.

61. The ink cartridge according to claim 60, wherein said recording liquid comprises a liquid medium, and said liquid medium comprises a polyhydric alcohol or an aliphatic monovalent alcohol.

62. The ink cartridge according to claim 61, wherein said polyhydric alcohol is at least one selected from the group consisting of ethylene glycol, thiodiglycol, and glycerol.

63. The ink cartridge according to claim 62, wherein said liquid medium contains water and a water-soluble organic solvent.

64. The ink cartridge according to claim 63, wherein the content of said water is in the range of 10–95% by weight of the recording liquid.

65. The ink cartridge according to claim 63, wherein the content of said water is in the range of 70–95% by weight of the recording liquid.

66. The ink cartridge according to claim 63, wherein the content of said water-soluble organic solvent is in the range of 1–50% by weight of the recording liquid.

67. The ink cartridge according to claim 63, wherein the content of said water-soluble organic solvent is in the range of 5–30% by weight of the recording liquid.

68. An ink cartridge comprising an ink bag impregnated with a recording liquid comprising a magenta component and a yellow component, wherein said magenta component is composed of a dye represented by the formula (A),

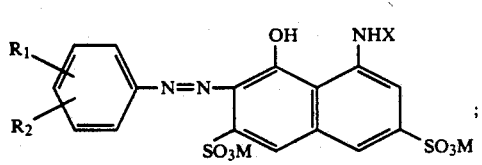

(A)

wherein $R_1$ and $R_2$ are independently selected from the group consisting of a hydrogen atom, a methyl group, a methoxy group, a chloro group, a sulfonic acid group,

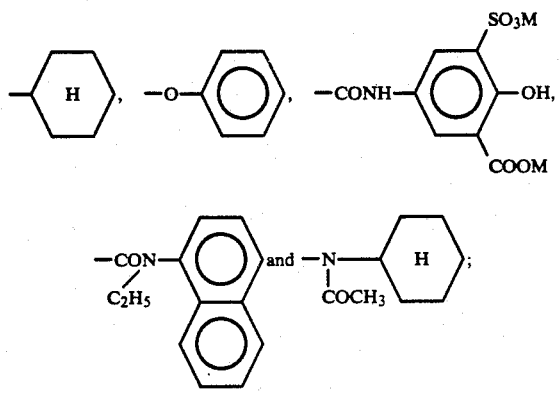

X is a residual group of an organic acid; and M is a base selected from the group consisting of an alkali metal group, an ammonium group, and an organic amine group; and C.I. Direct Red 227; wherein said yellow component is composed of at least one of C.I. Direct Yellow 86 and C.I. Direct Yellow 142 and wherein the dye represented by the Formula (A) comprises 20% to 70% of the total weight of the dyes and C.I. Direct Red 227 comprises 20% to 60% of the total weight of the dyes.

69. The ink cartridge according to claim 68, wherein said recording liquid comprises a liquid medium, and said liquid medium comprises a polyhydric alcohol or an aliphatic monovalent alcohol.

70. The ink cartridge according to claim 69, wherein said polyhydric alcohol is at least one selected from the group consisting of ethylene glycol, thiodiglycol, and glycerol.

71. The ink cartridge according to claim 69, wherein said liquid medium contains water and a water-soluble organic solvent.

72. The ink cartridge according to claim 71, wherein the content of said water is in the range of 10–95% by weight of the recording liquid.

73. The ink cartridge according to claim 71, wherein the content of said water is in the range of 70–95% by weight of the recording liquid.

74. The ink cartridge according to claim 71, wherein the content of said water-soluble organic solvent is in the range of 1–50% by weight of the recording liquid.

75. The ink cartridge according to claim 71, wherein the content of said water-soluble organic solvent is in the range of 5–30% by weight of the recording liquid.

76. An ink cartridge comprising an ink bag impregnated with a recording liquid comprising a magenta component and a cyan component, wherein said magenta component is composed of a dye represented by the formula (A),

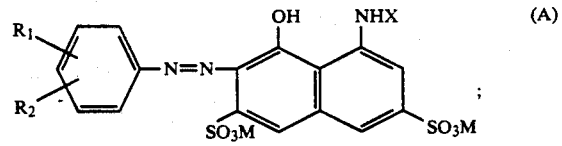

(A)

wherein $R_1$ and $R_2$ are independently selected from the group consisting of a hydrogen atom, a methyl group, a methoxy group, a chloro group, a sulfonic acid group,

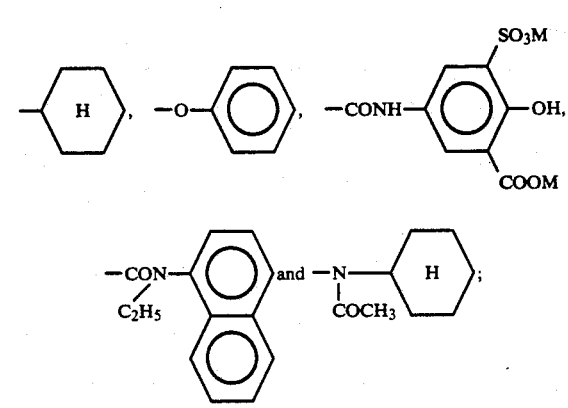

X is a residual group of an organic acid; and M is a base selected from the group consisting of an alkali metal group, an ammonium group, and an organic amine group; and C.I. Direct Red 227; wherein said cyan component is composed of at least one of C.I. Direct Blue 199, C.I. Direct Blue 86 and C.I. Acid Blue 198 and wherein the dye represented by the Formula (A) comprises 2% to 50% of the total weight of the dyes, and wherein C.I. Direct Red 227 comprises 5% to 30% of the total weight of the dyes.

77. The ink cartridge according to claim 76, wherein said recording liquid comprises a liquid medium, and said liquid medium comprises a polyhydric alcohol or an aliphatic monovalent alcohol.

78. The ink cartridge according to claim 77, wherein said polyhydric alcohol is at least one selected from the group consisting of ethylene glycol, thiodiglycol, and glycerol.

79. The ink cartridge according to claim 77, wherein said liquid medium contains water and a water-soluble organic solvent.

80. The ink cartridge according to claim 79, wherein the content of said water is in the range of 10–95% by weight of the recording liquid.

81. The ink cartridge according to claim 79, wherein the content of said water is in the range of 70–95% by weight of the recording liquid.

82. The ink cartridge according to claim 79, wherein the content of said water-soluble organic solvent is in the range of 1–50% by weight of the recording liquid.

83. The ink cartridge according to claim 79, wherein the content of said water-soluble organic solvent is in the range of 5–30% by weight of the recording liquid.

* * * * *

UNITED STATES PATENT AND TRADEMARK OFFICE
CERTIFICATE OF CORRECTION

PATENT NO. : 5,135,571          Page 1 of 3
DATED      : August 4, 1992
INVENTOR(S): Shirota et al.

It is certified that error appears in the above-identified patent and that said Letters Patent is hereby corrected as shown below:

COLUMN 1:

Line 3, "division," should be deleted.

COLUMN 2:

Line 24, "Formula" should read --Formula (A)--; and
　Line 45, "component said" should read --component, said--.

COLUMN 13:

Line 22, "3.2 part" should read --3.2 parts--;
　Line 35, "parativen" should read --parative--; and
　Line 61, "EXAMPLE 10" should read --　Red ink
　　　　　　　　　　　　　　　　　　　EXAMPLE 10 --.

COLUMN 17:

Line 14, "solution" should read --liquid--.

COLUMN 18:

Line 8, "solution" should read --liquid--;
　Line 13, "in" should read --of--; and
　Line 21, "solution" should read --liquid--.

COLUMN 19:

Line 30, "formula (A)" should read --Formula (A)--;
　Line 40, "consisting" should read --consisting of--; and
　Line 67, "33;" should read --33,--.

UNITED STATES PATENT AND TRADEMARK OFFICE
CERTIFICATE OF CORRECTION

PATENT NO. : 5,135,571

DATED : August 4, 1992

INVENTOR(S) : Shirota et al.

It is certified that error appears in the above-identified patent and that said Letters Patent is hereby corrected as shown below:

COLUMN 20:

Line 7, "formula (A)" should read --Formula (A)--; and
   Line 57, "formula (A)" should read --Formula (A)--

COLUMN 21:

Line 36, "formula (A)" should read --Formula (A)--;
   Line 45, "consisting" should read --consisting of--; and
   Line 68, ""wherein" should read --wherein--.

COLUMN 22:

Line 2, "dyes;"" should read --dyes;--;
   Line 15, "formula (A)," should read --Formula (A),--;
   Line 58, "ink device" should read --ink jet device--; and
   Line 68, "formula (A)" should read --Formula (A)--.

COLUMN 23:

Line 49, "formula (A)" should read --Formula (A)--.

COLUMN 24:

Line 30, "formula (A)," should read --Formula (A),--.

COLUMN 25:

Line 15, "formula (A)," should read --Formula (A),--; and
   Line 68, "formula (A)," should read --Formula (A),--.

UNITED STATES PATENT AND TRADEMARK OFFICE
CERTIFICATE OF CORRECTION

| | | | |
|---|---|---|---|
| PATENT NO. : | 5,135,571 | Page | 3 of 3 |
| DATED : | August 4, 1992 | | |
| INVENTOR(S) : | Shirota et al. | | |

It is certified that error appears in the above-identified patent and that said Letters Patent is hereby corrected as shown below:

COLUMN 26:

Line 10, "consisting" should read --consisting of--;
   Line 34, "group" should read --group, and--;
   Line 45, "claim 62," should read --claim 61,--; and
   Line 68, "formula (A)," should read --Formula (A),--.

COLUMN 28:

Line 3, "formula (A)," should read --Formula (A),--; and
   Line 36, "Blue 198" should read --Blue 198,--.

Signed and Sealed this

Fifth Day of October, 1993

Attest:

Attesting Officer

BRUCE LEHMAN

Commissioner of Patents and Trademarks